United States Patent
Palit et al.

(10) Patent No.: US 9,519,910 B2
(45) Date of Patent: *Dec. 13, 2016

(54) SYSTEM AND METHODS FOR CALIBRATING USER AND CONSUMER DATA

(71) Applicant: Rentrak Corporation, Portland, OR (US)

(72) Inventors: Charles Palit, Madison, WI (US); Bill Engel, Delray Beach, FL (US); Michael Vinson, Piedmont, CA (US); Bruce Goerlich, Forest Hills, NY (US)

(73) Assignee: RENTRAK CORPORATION, Portland, OR (US)

( * ) Notice: Subject to any disclaimer, the term of this patent is extended or adjusted under 35 U.S.C. 154(b) by 552 days.

This patent is subject to a terminal disclaimer.

(21) Appl. No.: 14/031,548

(22) Filed: Sep. 19, 2013

(65) Prior Publication Data

US 2014/0081703 A1 Mar. 20, 2014

Related U.S. Application Data (63) Continuation of application No. 13/836,591, filed on Mar. 15, 2013, now Pat. No. 8,543,523.
(Continued)

(51) Int. Cl.
G06Q 30/02 (2012.01)
G06N 99/00 (2010.01)
G06N 5/04 (2006.01)

(52) U.S. Cl.
CPC ...... *G06Q 30/0201* (2013.01); *G06Q 30/0202* (2013.01); *G06Q 30/0203* (2013.01);
(Continued)

(58) Field of Classification Search
None
See application file for complete search history.

(56) References Cited

U.S. PATENT DOCUMENTS 7,062,504 B2 * 6/2006 Cantu-Paz ........... G06K 9/6282
706/20
7,092,920 B2 8/2006 Heard
(Continued)

FOREIGN PATENT DOCUMENTS

CA 2874837 A 7/2015
CN 1689027 A 10/2005
(Continued)

OTHER PUBLICATIONS

First Office Action issued in Chinese Application No. 201380041071.X, mailed: Oct. 10, 2015, 13 pages.
(Continued)

*Primary Examiner* — Kakali Chaki
*Assistant Examiner* — Mai T Tran
(74) *Attorney, Agent, or Firm* — Baker & Hostetler LLP (57) ABSTRACT

A system and method that calibrates subject data for which a relationship to a target population is not known, so that the calibrated subject data can more accurately represent the target population. In many cases the calibration will involve the use of a differential weighting scheme applied to the data at the constituent level. The system and method allows the values of the observed variables in the subject data set to be weighted so that their incidence is equivalent to that of a reference population represented by a reference data set, even if the variables used in the reference data set to make estimates for the reference population were not collected or measured for the subject data set.

33 Claims, 4 Drawing Sheets

Related U.S. Application Data (60) Provisional application No. 61/654,771, filed on Jun. 1, 2012.

(52) U.S. Cl.
CPC .......... *G06Q 30/0207* (2013.01); *G06N 5/04* (2013.01); *G06N 99/005* (2013.01)

(56) References Cited

U.S. PATENT DOCUMENTS

| | | | |
|---|---|---|---|
| 7,529,720 | B2 | 5/2009 | Basak et al. |
| 7,698,250 | B2 | 4/2010 | Dwork et al. |
| 7,756,879 | B2 | 7/2010 | Parsons et al. |
| 7,783,648 | B2 * | 8/2010 | Bateni .................... G06Q 30/02 707/752 |
| 7,841,300 | B2 | 11/2010 | Skvorc, II |
| 7,873,529 | B2 | 1/2011 | Kruger et al. |
| 7,949,639 | B2 | 5/2011 | Hunt et al. |
| 8,000,993 | B2 * | 8/2011 | Harvey .............. G06Q 10/0639 705/14.41 |
| 8,195,593 | B2 | 6/2012 | Jung et al. |
| 8,543,523 | B1 | 9/2013 | Palit et al. |
| 2002/0077756 | A1 | 6/2002 | Arouh et al. |
| 2003/0182281 | A1 | 9/2003 | Wittkowski et al. |
| 2004/0162824 | A1 | 8/2004 | Burns |
| 2005/0021488 | A1 | 1/2005 | Agrawal et al. |
| 2007/0094060 | A1 | 4/2007 | Apps et al. |
| 2008/0270363 | A1 | 10/2008 | Hunt et al. |
| 2008/0288209 | A1 | 11/2008 | Hunt et al. |
| 2008/0288538 | A1 | 11/2008 | Hunt et al. |
| 2008/0288889 | A1 | 11/2008 | Hunt et al. |
| 2008/0294372 | A1 | 11/2008 | Hunt et al. |
| 2008/0294996 | A1 | 11/2008 | Hunt et al. |
| 2008/0319829 | A1 | 12/2008 | Hunt et al. |
| 2009/0006156 | A1 | 1/2009 | Hunt et al. |
| 2009/0006309 | A1 | 1/2009 | Hunt et al. |
| 2009/0018996 | A1 | 1/2009 | Hunt et al. |
| 2009/0055828 | A1 | 2/2009 | McLaren et al. |
| 2011/0077998 | A1 | 3/2011 | Yan et al. |
| 2011/0137924 | A1 | 6/2011 | Hunt et al. |
| 2011/0153390 | A1 | 6/2011 | Harris |

FOREIGN PATENT DOCUMENTS

| | | | |
|---|---|---|---|
| CN | 101593210 | A | 12/2009 |
| CN | 102201000 | A | 9/2011 |

OTHER PUBLICATIONS

International Search Report and Written Opinion for PCT/US2013/043798 filed on May 31, 2013, Date of Mailing: Aug. 29, 2013, 11 pages.
Canadian Office Action for Application No. 2,874,837, mailed on Jan. 7, 2015, 3 pages.
Canadian Notice of Allowance Application No. 2,874,837, mailed on Apr. 1, 2015, 1 page.
State Intellectual Property Office of the People's Republic of China, Second Office Action for Chinese Patent Application No. 201380041071.X (foreign counterpart application), dated Apr. 27, 2016.

* cited by examiner

SYSTEM AND METHODS FOR CALIBRATING USER AND CONSUMER DATA

CROSS-REFERENCE TO RELATED APPLICATIONS

This application claims the benefit and is a continuation of U.S. patent application Ser. No. 13/836,591, entitled "SYSTEM AND METHOD FOR TRANSFERRING INFORMATION FROM ONE DATA SET TO ANOTHER", filed Mar. 15, 2013, now U.S. Pat. No. 8,543,523, which claims the benefit of U.S. Provisional Patent Application No. 61/654,771, entitled "SYSTEM AND METHOD FOR TRANSFERRING INFORMATION FROM ONE DATA SET TO ANOTHER," filed Jun. 1, 2012. Each of these applications is incorporated by reference herein in their entirety for all purposes.

BACKGROUND

Today, media researchers and management information workers have at their disposal a wide range of information about consumers. Such data includes some sets collected by obtrusive, active measures, as well as some from passively-collected, unobtrusive observation. Examples of the former include surveys, warranty registrations, active data collection through internet-connected devices, and frequent shopper programs. Examples of the latter include data taken from transaction streams, coupon redemptions, credit card transactions, TV viewing behavior via digital set-top boxes, internet observed behaviors (such as interactions through cookies), IP tracking, and so forth. In the past, most of the data used for population estimates have been considered to be from data sets having some well-defined known relationship to the population, e.g., probability samples. Driven by demand, by failure of some of the old paradigms, and by new technologies, which produce diverse and potentially useful pieces of information, more and more of the available data is, on its face, from data sets which do not have well-defined known relationships to the population, and are not directly representative of the population to be measured. While all types of data are potentially useful (e.g., data for which a well-defined relationship to the population is in some way known as well as data for which a well-defined relationship to the population is not known), current technology provides very few tools for improving the accuracy of population estimates based on data that does not have well-defined known relationships between the elements of a data set and the elements of a population.

When the size of a population to be analyzed (the "target population") is large, researchers who need to analyze information about the target population (herein "primary data") rarely perform a systematic measurement of the primary data for all members of the population (that is, a "complete census") because the cost of gathering so much information is often too high, the time it takes to collect the data is too long, or it's impractical for some other reason. A well-known example of high data collection cost is the Decennial Census. In the United States, the 2010 Census cost approximately $13 billion dollars to collect data on approximately 308 million US residents, according to the U.S. Government Accountability Office publication, "Preliminary Lessons Learned Highlight the Need for Fundamental Reforms."

Because of the high cost of performing a census of a large target population, researchers will typically collect data from only a subset of the population (i.e., sample the population), and will then estimate characteristics of the overall population based on that sample and its relationship to the population. One problem with this method is that the sample can often be misleading due to the presence of known as well as unknown biases in the sample selection process itself. For example, a sample can often fall victim to a self-selection bias because some members of the sampled population refuse to be observed or cannot be observed. Samples, including those from transactional data sets (such as purchases made at a cash register by a credit card, television viewing behavior transactions performed in a household subscribing to a particular television service for which the viewing behavior transactions are being monitored, and so on) are often selective of participants in such a manner that the resulting sample is biased: it inaccurately represents the overall target population in substantial and unknown ways. The presence of these selection biases can make the resulting estimates of population characteristics inaccurate, in a directional or biased sense.

For convenience in this description, some terminology will now be defined. Collected data that is the primary data set used to make a population estimate, whether obtained obtrusively or unobtrusively, is hereinafter referred to as "subject data." A data set that is to be used to derive properties of a target population will be referred to as "reference data." Unobtrusively obtained data that represents specific events (such as a credit card transaction, a channel change on a television set-top box, a click on a URL in a web browser, a frequent flier transaction, or a loyalty program transaction with a merchant) is hereinafter referred to as "transactional data." A distinction is made herein between "personally-identifiable information"—which is to say, data of sufficient specificity that it can be used to identify a particular individual person or household, such as a social security number, a name/address combination, a credit card number, etc.—and "personal information" which, while not necessarily sufficient to identify a particular individual or household, is nevertheless considered to be private information, such as income, religious preference, age, etc. There are many legal restrictions around the use of personally-identifiable information. Furthermore, many companies are sensitive to the use of personal information, even in the absence of specific legal restrictions.

Media research has historically been carried out in situations where the researcher controls the sample, the sampling frame, and the survey questions asked. Statistical methods and estimation procedures have been developed to account for differences between the estimates and properties of the sample from the population and the overall population that is the target of the study. Through combinations of techniques—such as careful sample frame design, probability sampling, over-sampling, optimal allocation, and sample balancing—a rich toolbox of methodologies has been developed. Most of these techniques make use of probability theory to construct estimates of the population characteristics from sample data. Some, like sample balancing, do not use probability mechanisms but assume, at a minimum, that the data to be analyzed has sufficient detail to enable the researcher to construct calibration-type estimates, using the values for the calibration variables collected directly from the sample elements, to make estimates for the desired population. In summary these calibration estimates and processes require that the variables used for calibration be present in the data collected from the sample.

The usual estimation techniques based on probability sampling are often inadequate when the sample is subject to selection bias. The fact that the subject data set is not necessarily based on a probability sample drawn from a defined sampling frame which completely covers the target population means that the rate or incidence of some variables or their values may not be good approximations of the corresponding rate in the population at large as they would otherwise be. Estimators using this data do not have sample selection probabilities available to adequately correct for the resulting biases in the subject data set. If variables suitable for calibrating the estimators are available in the subject data set then calibration or related techniques can be used to adjust the estimates. However, these conventional statistical techniques require that the survey respondent-level information for the balancing variables is present in the subject data set. In other words, the sample balancing techniques require that all the variables used for balancing be present in (i.e., native to) the data set, such that the balancing variables may actually be observed or measured for each respondent in the data set. For example, in the course of making a population estimate conventional balancing techniques can be applied to improve the representativeness of a data set in order to match a target population's demographic statistics when the subject data set contains the necessary demographic data for every respondent in the data set.

The fact that such conventional survey estimating techniques require that all balancing variables be present in the data set is, however, a severe limitation in view of modern data privacy requirements. For example, many consumers are nowadays averse to allowing a survey, data collection, or marketing company to collect (or combine) personal information along with the primary survey or transactional data that is intended to be analyzed. Many consumers object to providing (or may be unable to provide) information such as whether they viewed a particular television advertisement, program, or channel, whether they viewed a particular internet Web site or otherwise consumed other internet content such as by using a smartphone application, whether they purchased or would purchase a particular product, and under which conditions did the actual or potential product purchase take place, did they use a particular service and associated conditions therein, and the like.

In some cases, a member of a target population may only choose to participate in a survey (or in a transaction) that collects personal information conditioned on the receipt of adequate compensation (such as monetary compensation, a product discount coupon, getting first in line to try a new product, etc.) for the perceived risk of their information being used or their privacy being potentially compromised. Other members of a target population may choose not to participate in any survey that collects any personal information at all. Therefore, the very fact that a researcher performs a survey that asks a respondent for personal information (as distinct from personally-identifiable information) or the very nature of the researcher offering a survey respondent compensation in exchange for such information (or not offering such compensation, or offering the wrong type or level of compensation) affects which portion of the population will become survey respondents, and thereby may introduce a bias into the survey results, which would not otherwise exist without the collection of the personal information. Furthermore, any of the other conditions under which the survey or data collection takes place (such as, for example, the time of day, the day of the week, the location, or a variety of other conditions under which different members of a target population may be more or less likely to respond), can affect the representativeness of the sample, and which portion of a population's potential respondents decide to participate, thus introducing a bias into the sample.

Moreover, consumers about whom information is collected in many transactional databases (which could be analyzed, similarly to how survey information relating to transactions are analyzed), may be entitled to receive notification about the conditions under which their personal information is used or shared with other companies. It is now often legally or culturally unacceptable even to ask a customer (such as may be a member of a target population for which a statistical analysis is desired) for their race, sex, age, height, weight, religion, family status, marriage status, disability status, mobility, home ownership, location, employment status, industry, income, education level, political affiliation, sexual preference, any other demographic information, or any other information that may be limited by a privacy policy (whether personally-identifiable information or personal information).

At the same time, such consumers are also generally empowered by law to demand a company to refrain from using or sharing their personal information in specific ways, thereby limiting the manner in which the company can use the consumer's personal information. For example, the Financial Services Modernization Act of 1999 (the "Gramm-Leach-Bliley Act") put a requirement in place for financial institutions to provide each consumer with a "privacy notice" at the time the consumer relationship is established, as well as every year thereafter. This and other privacy laws now exist in the US, as well as other countries, and affect a wide array of industries and markets.

One of the problems with eliminating personal information from a database, however, is that the prior art survey analysis techniques (such as sample balancing) for projecting the statistics of a survey or other data collection effort to a desired target population (such as a target market segment for the most profitable sales of a commercial product) require the presence of personal information in the data set, in order to make the survey statistics more representative of the target population (in other words, to reduce bias).

Much of the past art has concentrated on techniques of estimation which rely on probability sampling techniques and the building of probability-based estimators. In recent times, however, greater need has arisen to make more use of data sets which are not collected from strict probability samples (because, for example, of sample non-response or coverage problems with the frame, or because the data has been harvested from some other process designed for another purpose, etc.). As described above, this data often does not contain essential calibration variables needed to make reasonable estimates of population characteristics. The variables measured during data collection are often not as well selected as in a carefully planned sample survey which uses a probability sample and data collection instruments with targeted uses in mind, e.g., the current population survey conducted by the U.S. Census. The end result is that variables that are present in many data sets cannot be pre-determined by the researcher, and even if calibration variables are present, some or all may be excluded from use by privacy restrictions etc. attached to the data. Examples include internet ad-server logs, television set-top box viewing data, and credit card transactional data. Some of this data may often, for example, be the data remnants of a transaction or a piece of a transaction or internet interaction collected within a transactional "pipeline." Such data sets often include many millions or billions of data points, but each individual respondent data point may be lacking supplemental information such as traditional demographics data, and furthermore the sample may be of unknown quality and likely to be unrepresentative of the overall population due to inherent selection or other biases. There is therefore a need for estimation techniques that can leverage these data sets despite the absence of usable calibration variables from the data set collected. As a result of at least the aforementioned problems, a need exists for statistical estimation technique that allow estimates from survey or other sample data, transactional data, or statistics to be adjusted to be more representative of a desired target population without the need for having the variables used for the adjustment (such as the personal information for the participants) be present in the data set. Doing so would allow for more accurate estimation of the characteristics of a target population without requiring that personal information for the participants be stored, or even directly known.

DETAILED DESCRIPTION

A system and method is described herein that calibrates subject data for which a relationship to a target population is not known, so that the calibrated subject data can more accurately represent the target population. In many cases the calibration will involve the use of a differential weighting scheme applied to the data at the constituent level. The term "calibrate" or "calibration" as used herein means a method of making a data set or data sets resemble another data set or data sets.

The system and method described herein allows the values of the observed variables in the subject data set to be weighted such that their incidence is equivalent to that of a reference or target population using a reference data set from the reference population even if the variables used in the reference data set to make estimates for the reference population were not collected or measured for the subject data set. In particular, the system and method described here allows the estimates from the subject data set to be balanced or otherwise adjusted using personal information characteristics of the target population even though the personal information characteristics are not a part of the data collected in the subject data set.

The methodology presented does not require the presence of the calibration variables in the subject data set for the calibration variables to be used in conjunction with the subject data set in the production of statistics calibrated to the target population. It allows the construction of reference portions which use variables not available in the original data set (the "subject data") to calibrate or otherwise adjust the subject data estimates to the population for which the estimates are needed as reflected in a reference data set. For example, the disclosed methodology makes it possible to take household TV viewing data which contains only TV viewing variables (from a non-probability sample of unknown households in the U.S.) to produce a calibrated and more accurate estimate for viewing behavior of the U.S. population than would otherwise be possible with the subject data set alone.

In some embodiments, the methodology uses one or more compound variables to produce calibrated statistics for the target population. For example it is not unusual in sample balancing to calibrate first on age, then on gender, and then on race, etc. In the process disclosed herein, variables native to the data set, such as behavioral variables, are used to construct a "partition" variable, and one or more of these partition variables are subsequently used as the basis for calibration.

For example, after the subject data set of viewing behavior by household is divided into a number of subject partitions using a partitioning scheme, the incidence of these subject partitions is calibrated against the distribution of the same or similarly defined partitions in the target population. The incidence of the partitions in the target population is often determined from another data set which is called the reference data set. One example of this would be to weight the subject data observations in each partition by a partition weight so that the weighted estimates of incidence for each partition in the subject data set would be approximately the same as the estimate of incidence of each partition in the reference population. Another example is to use the reference data set to produce estimates of the incidence for the partitions of the target population, and then to weight the subject data set so that the weighted estimates produced for the partition incidences in the subject population would be the same as the estimates produced for the reference population using the reference data set.

In a similar way, the values of variables not present in the subject data set may be estimated from their values in the reference data set, "carried over" into the subject data by means of these partitions. For example, suppose variable A is present in the reference data set but not in the subject data set. Then, when the partitions are created in the reference data set, the incidence of the possible values for A is determined within each partition, and that relative distribution of incidence for the values of A is then applied to the elements or records in the corresponding partitions as they appear in the subject data set. The possible values of variable A may be expressed as a vector of probabilities for each of the possible answers, a single value appropriate to the task at hand, or an interval value. The single value may be the most likely response, the mean response, the median response, a weighted linear combinations of the response, etc. In this way, the possible values of variable A is estimated directly within the subject data set.

A further application of the disclosed technology is to estimate the degree to which several subject data sets represent a reference data set. By measuring the rates of incidence of the various partitions within each of the several subject data sets, and comparing those rates with the rates for corresponding partitions in the reference data set, the various subject data sets can be ranked or compared in the degree to which each one is representative of the reference data set. Representative statistics can be calculated from the most-representative of the various subject data sets. Alternatively, a weighted combination of statistics can be calculated across some or all of the various subject data sets based on the ranking or comparison.

Various embodiments of the invention will now be described with reference to the figures. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented herein is intended to be interpreted in its broadest reasonable manner, even though it is being used in conjunction with a detailed description of certain specific embodiments of the invention. Certain terms may even be emphasized herein; however, any terminology intended to be interpreted in any restricted manner will be overtly and specifically defined as such in this Detailed Description section.

A system and method is disclosed herein for calibrating a subject data set having a subject population so that it provides a better estimate of a reference population as reflected in a reference data set. The same variables or characteristics may not be present in both the subject data set and reference data set. The calibration includes using a partitioning scheme to partition the subject data set into subject partitions, calculating at least one statistic for each subject partition based on one or more variables present in the subject data set, adjusting each of the partition statistics using a reference portion associated with each subject partition, and combining the adjusted statistics. The reference portion associated with each partition is determined by using the partitioning scheme to partition the reference data set into reference portions. For example, the system and method may utilize information from a survey, a transactional data set, or census data representative of a desired population as a reference data set. The reference data set is used by the system to calibrate a subject survey, transactional data set, or behavioral data set and make the subject data set more reflective of the composition of the desired population. The reference data set may include personal information, while the subject data set may exclude personal information.

In some embodiments, the system and method utilize a non-probability inferential bridge to produce estimates which are more representative of the desired population by calibrating the estimates against variables not present in the subject data set. The system applies a set of calculated weights to the subject data set either in its raw form or an aggregated form. One benefit of the disclosed technology is that the variables used for balancing do not need to be native to or present in the subject data set, i.e., they need not be measured or observed for any of the records or elements of the subject data set projected to the population. It will be appreciated that allowing data to be adjusted based on variables not native to or in the subject data set is highly useful in light of modern data privacy policies.

In some embodiments, the system and method utilizes the conditional probability distribution for the reference population variables conditioned on each case's value. The balancing variables need not be present in the subject data set.

In some embodiments, the subject data set is a database containing television viewing data, and the system and method calibrates the television viewing data to represent more closely a target audience profile not already represented by the television viewing data and defined by a characteristic not stored in the television viewing data. For example, the television viewing data may omit certain demographic characteristics as a result of limitations contained in a privacy agreement under which an associated service or transaction is provided. Calibrating the television viewing data includes: dividing the television viewing data into groups according to group identifiers, and for each group, multiplying the group's data (or aggregated data represented thereby) by an estimator associated with the identifier of the group, and optionally aggregating the group products. The estimators may be determined by: dividing a reference data set having at least one target audience characteristic into groups according to the group identifiers, and for each group, determining an estimator for the group with respect to the target audience based on the at least one target audience characteristic for the group.

The system and method disclosed herein enables television viewing data reflecting the television viewing behavior of a set of households to be used, even though the television viewing data contains little or no information as to the demographic make-up of the households. The system enables the television viewing data to be calibrated to reflect the population of a behavioral group, such as, but not limited to, a group defined by a specific demographic profile.

In some embodiments, the system and method disclosed herein may be used in conjunction with transactional data sets that represent credit card users, online transactions, or shopping basket purchases at cash registers. The system allows such transactional data sets having no associated personal information to be calibrated such that biases caused by frequency of use are mitigated. Mitigation is achieved by relying on disparate data sources that, together with the transactional data sets, isolate groups of over-representation and under-representation based on transactional behavior alignments. In these cases, the disparate data sources work together to improve the estimates with respect to the true nature of the observations.

The System

Figure 1:
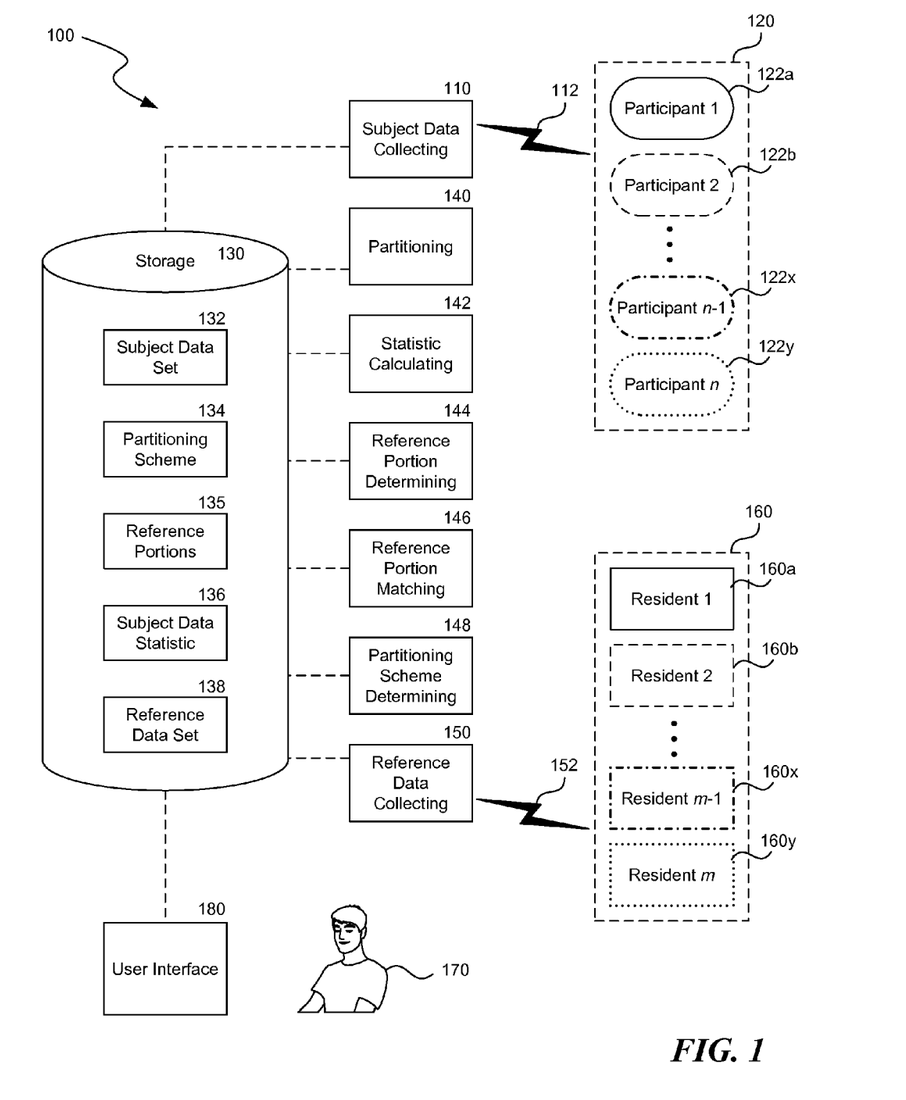
FIG. 1 is a block diagram for a system that analyzes subject data based on reference data and a partitioning scheme.

FIG. 1 is a block diagram of a system 100 that analyzes a collected subject data set 132 and calibrates estimates based on the subject data set so that statistics of the subject data set more closely reflect the composition of a reference data set 138 as measured in one or more dimensions, such as the behavioral and/or demographic characteristics of a population reflected in the reference data set. In order to calibrate the subject data set 132, the system utilizes a partitioning scheme 134 to divide the subject data set 132 set into groups. These groups, or "partitions," are adjusted by the system such that the subject data set 132 is calibrated to be more representative of the desired population that is reflected by the reference data set 138. When a subject data set is calibrated in this fashion, the estimates or projections for the variables used in the calibration change, as well as the estimates or projections from at least some of the other variables in the subject data set even if they are not used in the calibration process. The values of the variables in the reference data set, however, do not change.

The system includes a subject data collecting component 110 for collecting the subject data set 132 that is representative of the actions of a plurality of participants 120a, 120b, . . . 120n. The participants 120 may be consumers, survey participants, or other individuals, and their actions may be reflected either directly or indirectly by the collected data, which may be collected obtrusively or unobtrusively. Those skilled in the art will appreciate that the subject data set may encompass a wide number and types of participants. For example, the subject data set 132 may include data reflecting tens, hundreds, thousands, millions, etc. of participants. The subject data set contains information that directly or indirectly reflects participant behavior. For example, participants may be identified by: a computer identifier (such as a serial or identification number of a computer or hardware, which may indirectly represent a human user of the computer), an identifier of a mobile phone used by a user, a household identifier (such as one that references a house, dormitory, military housing unit or base, hospital, or other group quarters with a television set, from which television viewing data could be collected and used as subject data), a financial account identifier (such as a credit card account for which purchase information is collected), a vehicle license plate number (about which a person's driving behavior could be collected for the subject data), a Web site visitor identifier, such as an internet protocol address (about which Web navigation history of a person could be collected), a taxpaying entity (about which various other information may be collected), and so on. The subject data collecting component may receive the subject data set 132 via a public or private, wired or wireless network 112 (e.g., the internet). The subject data set 132 may originate from verbal questioning such as in a focus group, from observation such as using a video or still image camera, by collecting written survey answers, by computer-administered surveys, from recorded and observed survey data, from cash register transactions (such as credit card transaction history for a particular vendor or financial institution), and the like. The subject data set 132 may be obtained obtrusively or unobtrusively, i.e., the participants' behavior that is reflected in the subject data set may or may not know that the data set is being collected about their behavior.

In some embodiments, all or some portions of the subject data set 132 could be collected by a third party, such as a television service provider who provides television viewing data. In some embodiments, some collected information is combined with other collected information, such as by combining two data sets about which the participant identifiers are shared in common (e.g., a first Web server's log of internet protocol ("IP") addresses being combined with a second Web server's log of IP addresses, when some of the IP addresses overlap).

The system stores the subject data set 132, among other information, in a storage device 130. The storage device 130 may include any type of computer-readable media that can store data accessible by the computer, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, the system may employ any medium for storing or transmitting computer-readable instructions and data, including a connection port to or node on a network such as a local area network (LAN), wide area network (WAN) or the Internet. In some embodiments, the system utilizes multiple data storage devices instead of the single storage device 130 illustrated. Aspects of the invention described herein may further be stored or distributed on computer-readable media, including magnetic and optically readable and removable computer discs, stored as firmware in chips (e.g., EEPROM chips), as well as distributed electronically over the Internet or over other networks (including wireless networks).

Additionally, the storage device 130 stores a partitioning scheme 134 that a partitioning component 140 utilizes for partitioning (i.e., dividing into groups) the subject data set 132 and the reference data set 138. The partitioning scheme 134 may consist of analysis parameters or computer readable instructions that specify for a data set and a plurality of data partitions, which of the contents of the data get placed into any given partition. In some aspects, the partitioning scheme is a function that can receive a participant or resident as input, additionally combined with associated participate or resident data, and return a partition identifier (e.g., "first partition," "second partition," etc.) that the scheme assigns to the participant or resident. The partitioning scheme 134 divides all of the contents of a data set (e.g., subject data set 132 or reference data set 138) into a plurality of partitions in a non-overlapping manner, meaning that the content of the data set that is associated with a single participant or resident is not copied into two different partitions.

The system 100 may utilize various partitioning schemes to partition a data set into at least two partitions. Depending on the application, the system may divide the data set into any number of partitions, such as ten partitions, thirty partitions, thousands of partitions, and so on. In an example of partitioning the television viewing behavior of households analyzed on a local or national level, a partitioning scheme generating between 10 to 30 partitions has been found to be a useful range for partitioning the households. For some subject data set analysis needs, it is desirable for the partitioning scheme to partition the data in a homogenous manner (i.e., where the constituents of a given partition do not vary significantly across one or more variables). Examples of how the system 100 utilizes the partitioning scheme for partitioning the subject data set 132 and the reference data set 138 are described in greater detail below. A partitioning scheme determining component 148 of the system 100 determines the partitioning scheme 134. The functionality of the partitioning scheme determining component 148 is described in additional detail under the below heading "PARTITIONING SCHEME CALCULATION".

The system 100 utilizes a statistic calculating component 142 for calculating at least one subject data statistic 136 from the subject data set 132. (The system 100 may also calculate statistics of the reference data set 138.) In some examples, the statistic calculating component 142 calculates individual statistics for partitions of the subject data set 132, adjusts the calculated statistics using a reference portion matching component 146, and combines the adjusted statistics of the partitions.

The reference portion matching component 146 adjusts at least one statistic of a subject partition that the system 100 has calculated so that the subject partition more closely matches the reference portion that corresponds to the subject partition. When the plurality of partitions are adjusted so that the distribution across partitions of the subject data set 132 matches the distribution across partitions of the reference data set 138, the subject data set 132 is calibrated to be more representative of the desired population as reflected in the reference data set 138.

A reference portion determining component 144 determines, given the reference data set 138, and the partitioning scheme 134, the corresponding reference portions 135 that will cause the reference portion matching component 146 to calibrate the partitioned subject data set in order to represent more closely the population defined by the reference data set 138. Additional details of determining the reference portions are provided under the below heading "REFERENCE PORTIONS CALCULATION".

A reference data collecting component 150 collects the reference data set 138 in any appropriate manner. For example, the system 100 may collect the reference data set 138 using any technique described above for the collection of the subject data set 132 by the subject data collecting component 110. The term "residents" 160 is used herein to describe any group about which the reference data set 138 may be obtained. The reference data set may include survey participants, consumers, respondents, purchasers, viewers and so on. In embodiments where the reference data collecting component 150 utilizes census collection techniques, the reference data set 138 may be a census. Note that the number of residents, m, of the reference data set, will not usually match the number of participants, n, of the subject data set, and the subject data set may or may not share any individuals in common with the reference data set. Moreover, the data associated with each individual in the reference data set will often be different from the data associated with each individual in the subject data set. Typically, the reference data set 138 will contain some variables in common with the subject data set 132 and other variables that are not represented in the subject data set but are estimates for the population represented by the reference data set. In cases where one of the participants 120 in the subject data set 132 is a resident 160 of the reference data set 138, the system 100 may or may not be able to directly identify the match. Even when the system 100 is not able to identify the match directly, when the data sets 132 and 138 contain distinctive patterns (such as habitual behavioral or other distinctive transactional patterns) and when the partitioning scheme 134 effectively partitions based on these patterns, the system 100 will likely partition an individual who is both a participant and a resident into the same partition. The reference data set 138 may or may not include personal information collected from at least a portion of its residents 160.

The reference data set 138 provides a reference for the system 100 to calibrate the subject data set 132 (or, one or more calculated statistics thereof) so that the subject data set more closely approximates a reference population. For example, the reference data set 138 may be census data, which characterizes each resident 160 in terms of a set of demographic variables. In some embodiments, personal information of the reference data (such as demographic information of the residents) are analyzed and adjusted, as necessary, to arrive at one or more desired personal characteristics for the reference population. The reference data set 138 serves as a reference for determining the reference portions 135 which are used to adjust at least one statistic 136 of the subject data set to make it more closely match a reference population onto which projection of the subject data set 132 is desired.

A user 170 of the system may utilize a user interface 180 to specify various analysis options, such as the desired reference data set 138, the desired subject data set 132, the desired partitioning scheme 134, and so on. The system 100 may also provide the analysis parameters being used, and corresponding statistics (including before or after adjustments and combining), so that the user 170 may monitor the analysis process and refine the parameters. In some embodiments, the user interface may simply present the analysis result to the user 170 without allowing the user to alter the analysis options. In some aspects not illustrated in FIG. 1, the analysis is delivered to another system for further processing, reporting, etc.

In some circumstances, it may be desirable to precondition the reference data set 138 or subject data set 132 before applying the partitioning methodology disclosed herein. If the reference data set is not reflective of a desired population, the reference data set 138 may be preconditioned by the system 100 to reduce bias or improve accuracy before relying upon the reference data set. One example of preconditioning would be for the system 100 to adjust the reference data set 138 so that it more closely resembles a group of individuals represented by desired population census data. Population census data may be obtained from government bodies, corporations, or any other source which collects such data. If the subject data set 132 is not reflective of a desired population, the subject data set 132 may similarly be preconditioned by the system 100 to reduce bias or improve accuracy before further calibrating the subject data set 132 as disclosed herein.

In some circumstances, properties of the target population that are needed may be derived from the reference data by using a variety of estimation procedures. Properties may be derived using computational procedures which directly parallel the procedures that would be used to derive the same population properties or parameters from the population as a whole, such as means, sums, etc, Alternatively, properties of the target population may be derived using more complex procedures, such as weighted means and sums, or even more complex procedures as required to attain the needed estimates of the population properties.

Figure 2:
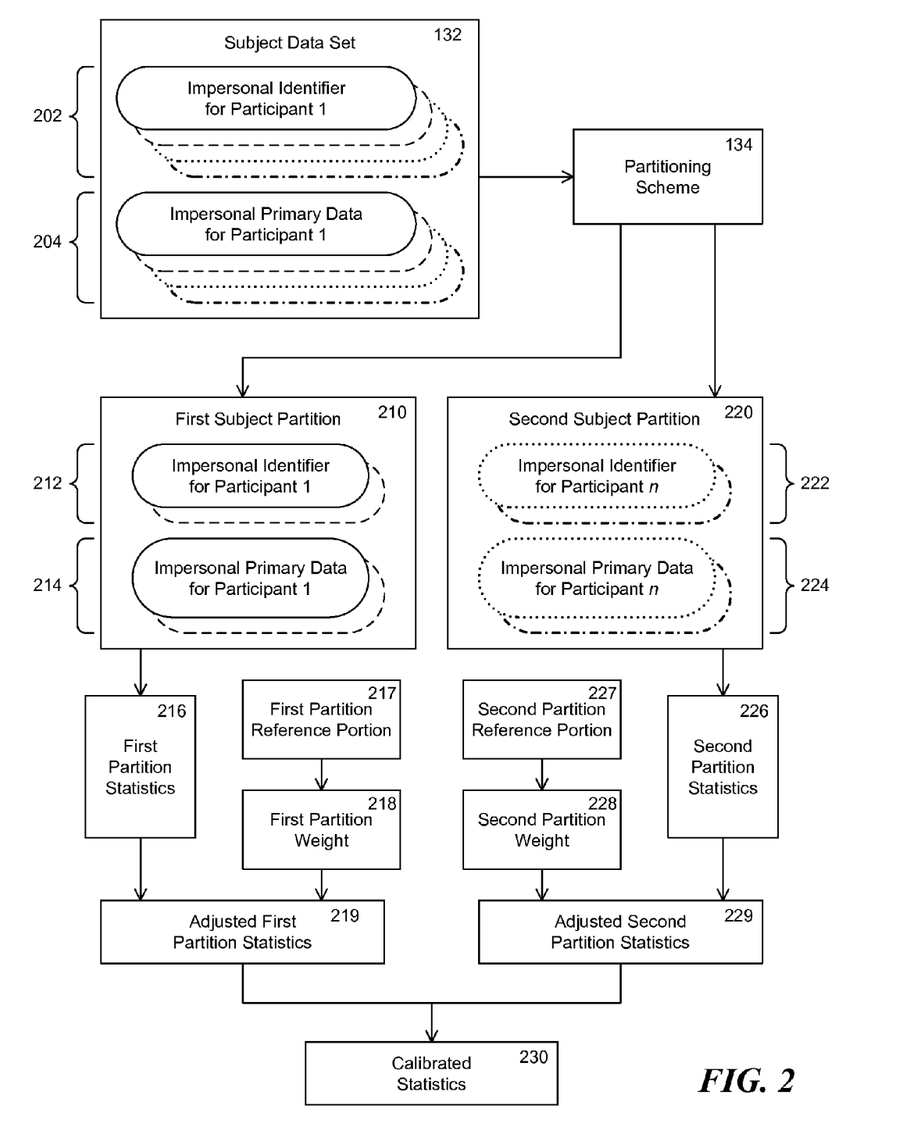
FIG. 2 is a data flow diagram illustrating the analysis of subject data by: partitioning the subject data, calculating statistics for the partitions, adjusting the statistics based on reference portions, and combining the adjusted statistics.

FIG. 2 is a data flow diagram illustrating the analysis of subject data set 132 that is performed by the system 100. The system partitions the subject data set 132, calculates statistics for the partitions, adjusts the statistics based on reference portions 135, and combines the adjusted statistics. The arrows here generally indicate that the system 100 is performing a data processing operation.

The illustrated subject data set 132 shows impersonal identifiers 202 for the participants 120, in combination with associated impersonal primary subject data 204, also for the participants 120. "Impersonal" means that, in some aspects, the collected subject data may include limited personal information, or in some aspects, no personal information at all. In some aspects, the participant identifier may simply refer to the associated primary data within the subject data set 132. In other aspects, the participant identifier may include some other identifier that is not personal, such as a random or hashed number assigned to the participant. The primary subject data 204 may be the answers a participant gave to survey questions, or any other observed data, behavioral data or transactional data, etc. that the subject data collecting component 110 collects, whether obtrusively or unobtrusively.

In some aspects, the information collected by the subject data collecting component 110 may be processed or refined, such as to eliminate the unnecessary transmission and/or storage of data, such as to prevent the subject data set 132 from having unnecessary stored data. Selectively analyzing only certain data can reduce the storage requirements for storage component 130, can reduce the required bandwidth for the network 112, and can reduce the liability or potential damage that may be associated with receiving or storing undesirable data (such as personal data prohibited by modern data privacy requirements), etc. A further function of subject data collecting component 110 may be to validate, test, pre-process, or clean the subject data set 132, such as to detect missing data and optionally to estimate or otherwise account for the absence of certain data components of subject data set 132 for particular participants 122 or for particular periods of time.

The subject data set 132 may be used by the partition scheme determining component 148 in order to calculate the partitioning scheme 134, although in other embodiments the partitioning scheme 134 may be determined without the subject data set 132. The partitioning component utilizes the subject data set 132 and the partitioning scheme 134 to partition the subject data set 132 into at least two partitions (e.g., a first survey partition 210 and a second survey partition 220). The partitioning component 140 may utilize any number of at least two partitions, although for the sake of brevity, only two partitions 210 and 220 are illustrated in FIG. 2. The partitioning component 140 will generally partition the subject data according to the primary data 204. For example, if the primary data 204 contains television viewing behavior such as which channels a participant (such as a household) was watching at associated times or the total duration of viewing on specific channels, the partitioning component may specify whether to place the identifier 202 and the primary data 204 that correspond to that participant into a particular partition, e.g., partition 210 or 220, based on whether the participant was (or has a tendency toward) viewing television at a particular time or day, or during a particular time of day (or "daypart"), or on a particular channel or type of channel, or has a particular channel changing behavior (e.g., skips over commercials, frequently changes channels), or watches a lot of television, or tends to view high-definition content, or views a great deal of time-shifted content (for example via a Digital Video Recorder or Video on Demand, or other non-traditional sources of television content such as online), or any combination of the aforementioned particularities, and so on. The partitioning scheme 134 may consist of simple or complicated algorithms (for example, algorithms considering many different aspects of the primary data 204, at times considering many factors at once).

In the first partition 210 that is illustrated by FIG. 2, participant 1 (122a) and participant 2 (122b) are shown as being partitioned into the first partition 210, as represented by those participants' associated identifiers 212 and primary data 214 appearing in the first partition 210. Accordingly, the remaining participants 122x and 122y illustrated in the subject data set 132 are shown, along with their associated identifiers 222 and primary data 224 as being partitioned into the second partition 220. Although FIG. 2 illustrates the example of four participants (n=4), two partitions, and a particular combination of participants appearing in the partitions, these were selected for the sake of a clear presentation and brevity and are not to be interpreted as a restriction of the scope of the invention. One with ordinary skill in the art will realize that many other numbers of participants (i.e., "n"), other numbers of partitions, and other combinations of partitioned participants is possible, even for a much larger number of participants, or a much larger number of partitions. Members of the partitions will share certain information in common, depending on what primary data 204 is available, and on the behavior of the partitioning scheme. For example, if television viewing behavior for a several day long period is available, and if the partitioning scheme places participants into a first survey partition 210 if they perform the majority of (or some specified fraction of or total number of hours of) their television viewing during the "daytime" daypart (which could be defined as the hours of 7 AM to 4:30 PM local time on Monday-Friday), then they will have at least that television viewing behavior in common (or other things correlated that are not directly recorded in the subject data set 132, such as: a particular gender, an income level in a certain bracket, a certain employment status, residence in certain geographic areas, etc.).

In some aspects, the system 100, for example using the statistic calculating component 142, generates one or more statistics 216 for a first survey partition 210, based on the first partition 210. For example, a statistical calculation may comprise a portion of the partition's members (i.e., those described by the identifiers 212) that have watched a particular program on a particular channel at a particular time for at least a particular duration, such as a televised, one-hour Republican presidential candidate debate airing at a particular time. For example, if participant 1 viewed some predetermined minimum portion of the debate (e.g., 1 second, 6 minutes, or 24 minutes), but participant 2 did not view the debate at all (or viewed it for less than the predetermined minimum portion), then the corresponding statistic calculated for the first partition 210 could be 50%. This statistic indicates that half of the considered participants met the statistical condition.

Many other calculable statistics may be utilized, such as an average of a numerical value represented by the primary data (e.g., the duration that a particular program was viewed by the participant, the amount of time-shifted viewing, the fraction of the total available viewing minutes that were viewed, the number of channel changes during the duration of the content, etc.). In some cases, a statistic may be an aggregated (e.g., combined) value instead of an average value, or it may be a mean, median, mode, standard deviation, standard error, or any other kind of statistical calculation that can be performed on the data. For example, a statistic may represent the average time spent watching a specific television program.

The system also may calculate statistics 226 for the second partition 220 using the same or different formulas or statistical calculation methods utilized for calculating the statistics 216 for the first partition 210. Referring to the example calculated static for the portion of the population that viewed the televised Republican presidential candidate debate, if neither of the second partition 220 participants (e.g., the participant 122x or 122y) viewed the debate at all or for at least the required minimum duration, a statistic calculated and stored within 226 would include 0 (or 0%).

In the illustrated two partition example, the reference portions 135 consist of a reference portion for the first partition 217, and a reference portion for the second partition 227. It will be understood that although only two partitions are shown in the figure for the sake of brevity and clarity, in various embodiments, the number of such partitions can be much greater than two. The reference portion matching component 146 utilizes the first partition reference portion 217 for adjusting the first partition statistics 216 and creating the adjusted first partition statistics 219. The adjustment may involve the calculation of a first partition weighting factor 218, which may be performed by dividing the reference portion by the subject partition portion. For example, the subject partition portion may be defined as the number of participants in each partition divided by the total number of participants 120, and the reference portion may be computed as a similar ratio based on the reference data set 138. For example, when the two participants of the first partition 210 are divided by the four total participants of the subject data set 132, the first partition portion (for the first partition 210) would be 50%. If the first partition reference portion 217 were 60%, dividing it by the first partition portion 50% would give a first partition weight (or "weighting factor") 218 of 1.2 (or 120%). The reference portion matching component 146 applies the weight (e.g., the first partition weight 218) to the calculated partition statistic (e.g., the first partition statistics 216) in order to calculate adjusted statistics for the partition (e.g., adjusted first partition statistics 219). For example, if the first partition statistic 216 indicated that the value 50% of the first partition 210 participants viewed the televised Republican presidential candidate debate, and if the first partition weight 218 were 120%, then the adjusted first partition statistic 219 would indicate an adjusted value that 0.6 (or 60%) of an adjusted first partition viewed the debate. The same statistic calculation performed for the first partition may be performed for the other partitions. For example, the second partition statistics 216 may include the value 0 (or 0%) when both of the participants 3 ("n−1") and 4 ("n") in the second partition 220 did not view the Republican presidential candidate debate.

Weights may be expressed as fractions, percentages, absolute numbers, or other factor or multiplier. In some embodiments, the partition weights may be calculated by different procedures. For example, a set of weights may be calculated so that a subset of participant data that includes certain additional reference variables are weighted to give values consistent with the reference data set 138. As another example, weighting of the data may be accomplished with a mathematically-equivalent process that adjusts a record or groups of records. That is, records or groups of records may be duplicated or otherwise adjusted in order to achieve the same weighting effect with or without the use of factors, multipliers or other mathematically-equivalent operations.

When a partition weight is above 1.0, it means that the system 100 has determined that the partition is under-represented (i.e., there are too few participants in the partition in the subject data set). When the partition weight is below 1.0, the partition is over-represented (i.e., there are too many participants in the partition in the subject data set). When the partition weight is equal to 1.0, the survey partition is neither over—nor under—represented, and the adjusted partition statistics will be the equal to the unadjusted partition statistics. (For example, if the first partition weight 218 is 1.0, then the adjusted first partition statistics 219 would be equal to the unadjusted first partition statistics 216).

The items in FIG. 2 referencing the second partition (e.g., the partition 220, the identifiers 222, the primary data 224, the statistics 226, the reference portion 227, the partition weight 228 and the adjusted statistics 229) interact with each other in a similar and corresponding manner to how the items in the figure referencing the first partition 210, 212, 214, 216, 217, 218, and 219) interact with each other. Furthermore, the system 100 could be extended to utilize more than two partitions with an appropriate partitioning scheme 134 and additional supporting data items and processing steps. It can also be extended to include more than a single subject data set 132 and single reference data set 138.

After the reference portion matching component 146 has adjusted the at least one statistic (e.g., 219 and 229) for each of the partitions, it then combines the adjusted statistics to create an at least one calibrated statistic 230 for the subject data set 132. The manner in which the adjusted statistics for the partitions (e.g., 219 and 229) are combined depend on the statistics, but may include performing an averaging operation of them, such as a weighted average (e.g., based on the non-adjusted number of partition participants), adding them (for counting-based statistics), further subdividing or portioning them, and so on.

For example, if the first partition statistic 216 represents "there are two households in partition 1, one of which watched the Republican Presidential debate and the other did not," and the second partition statistic 226 represents "that there are two households in partition 2, neither of which watched the Republican debate" then the calibrated statistic 230 may be calculated in accordance with the following example:

(1) For purposes of the example, assume that the calculated first partition weight 218 is equal to 1.25 per household, and the calculated second partition weight 228 is equal to 0.75 per household. In other words, the households in the first partition are to be up-weighted to adjust for under-representation, and the households in the second partition are to be down-weighted to adjust for over-representation in the calibrated statistics.

(2) Calculate the first partition adjusted statistics 219:
- (a) Household 1 in Partition 1 watched the debate, therefore its adjusted contribution to the adjusted first partition statistic 219=1.25 (first partition weight)*1.0 (did view)=1.25 weighted viewing.
- (b) Household 2 in Partition 1 did not watch the debate, therefore its contribution to the adjusted first partition statistic 219=1.25 (first partition weight)*0.0 (did not view)=0.0 weighted viewing.
- (c) The sum of the total weighted viewing in the first partition=1.25+0.0=1.25 (i.e., the adjusted first partition statistics 219). The sum of the weights in the first partition=1.25+1.25=2.5.

(3) Calculate the second partition adjusted statistics 229:
- (a) Household 3 in Partition 2 did not watch the debate, therefore its contribution to the adjusted second partition statistics 229=0.75 (second partition weight)*0.0 (did not view)=0.0 weighted viewing.
- (b) Household 4 in Partition 2 did not watch the debate, therefore its contribution to the adjusted second partition statistics 229=0.75 (second partition weight)*0.0 (did not view)=0.0 weighted viewing.
- (c) The sum of the total weighted viewing in the second partition=0.0+0.0=0.0 (i.e., the adjusted second partition statistic 229). The sum of the weights in the second partition=0.75+0.75=1.5.

(4) Calculate the calibrated statistics 230 by summing the weighted households within the adjusted first partition statistics 219 and adjusted second partition statistics 229, and dividing by the sum of the total weights:
- (a) Sum of total adjusted viewing=1.25 (first adjusted partition statistics)+0.0 (second adjusted partition statistics)=1.25
- (b) Sum of the weights=2.5 (first partition)+1.5 (second partition)=4.0
- (c) Calibrated statistics 230=sum of total adjusted viewing/sum of weights=1.25/4.0=0.3125

In other words, after calibration the statistics reflect that 31.25% of the households watched the debate within the partitioned population.

All items illustrated on FIG. 2 with reference to the second survey partition 220 (e.g., 220, 222, 224, 226, 227, 228 and 229) are utilized, calculated, determined, matched, and so on by the system 100, and interact with each other in a corresponding and similar manner to how the first survey partition 210 and its corresponding items 210, 212, 214, 216, 217, 218, and 219) are utilized and interact with each other. The embodiment described here can be extended to any number of such partitions.

In some aspects of the invention, the reference portion matching component 146 may, instead of applying weights to calculated statistics directly, save the weights (e.g., 218 and 228) or the reference portions (e.g., 217 and 227) directly in the subject data set 132 directly for subsequent usage by the system 100, or for possible usage by a different system. In some aspects, weights or reference portions are stored along with the primary subject data 204, in the partitions (e.g., 210 and 220).

Some embodiments of the invention may use additional data present in both some portion of the subject data set and some portion of the reference data set in order to compute the partition weights. The weights are then calculated by choosing them so that the weighted incidence of the additional data variables in the subject data set match the incidence of the same additional data variables in the reference data set.

Further embodiments of the invention may use the partitions to "carry over" variables into the subject data set from the reference data set. For example, suppose variable A is present in the reference data set but not in the subject data set. When the partitions are created in the reference data set 138, the system 100 determines the incidence of the possible values for variable A within each partition. The values of variable A may be expressed as a single value, an interval value, or a vector of probabilities for each of the possible answers associated with a partition. The single value may be the most likely response, the mean response, the median response, a weighted linear combination of the response, etc. The relative distribution of incidence for the values of variable A is then applied by the system 100 to the elements or records in the corresponding partitions in the subject data set 132. In this way, the possible values of variable A is estimated directly within the subject data set, even if not present in the subject data set. In a similar fashion, variable A may be present in the subject data set but not in the reference data set. In this case, the variables from the subject data set may be used to carry over values of the variables to the reference data set.

On occasion, either the reference data set 138 or the subject data set 132 may in the judgment of a user 170 have need for a variable which does not appear in either of the data sets. In such a case, the system 100 can generate a modeled variable that is applied to one or both data sets. The system 100 generates a modeled variable by relying on an outside data set (not shown) which contains the modeled variable. The system determines an incidence of the possible values for the modeled variable across partitions of the outside data set, and applies the modeled data within each partition of the reference data set 138 or the subject data set 132 for the purposes of enriching the partitioning scheme.

In some aspects of the invention, the system may optimize computational efficiency, or reduce unnecessary data storage or data transferring by skipping unnecessary steps. For example, if the result of a statistic calculated for a specific partition index is predetermined to be a certain value, that value may be utilized by the system rather than calculating the statistic for that partition index. Similarly, when the application of the reference portions 135 is predetermined to have an insufficient effect to warrant the calibrating (e.g., the partitioning, the partition statistic calculating, the partition statistic adjusting, and the combining), the system may decide not to partition the data. In another example, the system may save unnecessary computation, storage, or data transfer by excluding a portion of the subject data set 132. This may be especially useful when the application of the reference portions 135 tend to help correct the inaccuracies caused by excluding a portion of the subject data set 132. In some cases, this allows saving cost by not needing to purchase or collect as large a quantity of subject data.

Reference Portions Calculation

Figure 3:
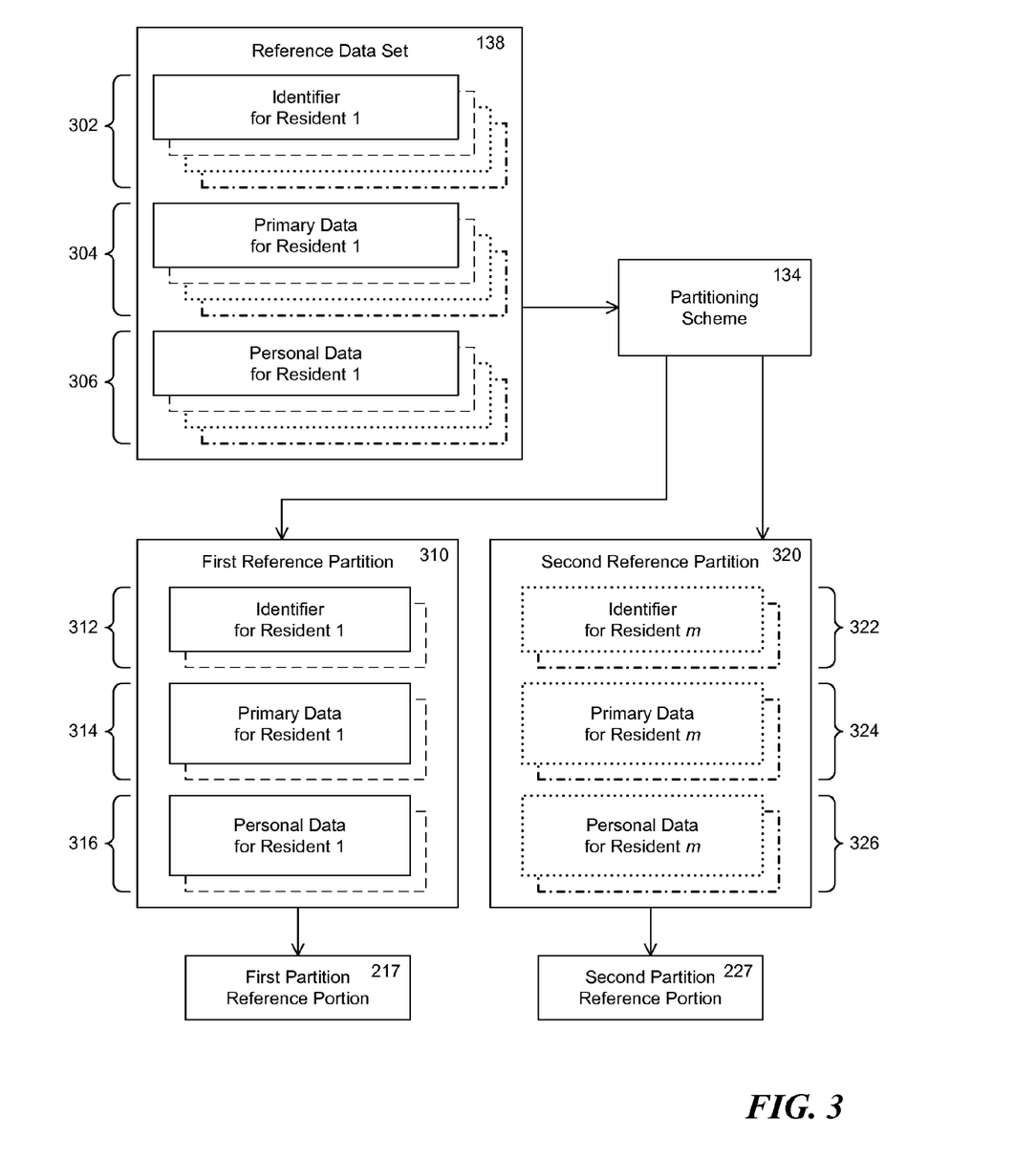
FIG. 3 is a data flow diagram illustrating the determination of the reference portions based on reference data and a partitioning scheme.

FIG. 3 is a data flow diagram illustrating the calculation of the reference portions 135 based on a reference data set 138 and a partitioning scheme 134. As with FIG. 2, the arrows generally indicate that the system 100 is performing a data processing operation.

The reference data set 138 contains identifiers 302 and primary data 304 for each of its residents 160. Optionally, the reference data set 138 may also include personal data 306 associated with all, or a portion of, the residents 160. Personal data is information that might be used to identify an individual and which is subject to heightened security precautions when using or publishing such data. The security precautions may be dictated by a government, company, policy board, or other institution.

The number of residents 160 that appear in the reference data set 138 of FIG. 3 is four (m=4) for the sake of brevity. However, many other numbers ("m") of residents may be present in the reference data set 138. It may be a number that is greater than, equal to, or smaller than the number ("n") of the participants 120.

As was described above for FIGS. 1 and 2, the partitioning component 140 utilizes the partitioning scheme 134 to partition the reference data set 138 into a plurality of reference partitions 310 and 320 based on the residents' primary data 304. Any personal data 306 associated with the resident being partitioned will be maintained in the partition for that resident.

For example, the first reference partition 310 shows identifiers 312, primary data 314, and any personal data 316 corresponding to the residents (e.g., resident 1 (160a) and resident 2 (160b)) of the first reference partitions. As another example, the second reference partition 320 contains identifiers 322, primary data 324, and any personal data 326 available for its residents (e.g., the resident "m" (160y) and the resident m−1 (160x).

The reference portion determining component 144 may then create the reference portions 135 for each of the partitions (e.g., the first partition's reference portion 217 and the second partition's reference portion 227) by, for example, dividing the number of residents in the partition by the number of residents in the data set. The process of calculating the reference portion for a partition is repeated for each of the reference partitions. For example, if there are six residents in the first reference partition 310, and ten residents in the reference data set 138, then the determined first partition's reference portion 217 would be 6÷10=60% (or 0.6). If there are four residents in the second reference partition 320, and ten residents in the reference data set 138, the second partition reference portion 227 would be 4÷10=40% (or 0.4).

In some embodiments of the invention, the reference portions 217 and 227 may be further adjusted, or may be calculated differently, such as when the reference population for which analysis is desired is not the same as the residents 160 of the reference data set 138. For example, if the personal data of a particular partition (such as the personal data 316 for the first partition) is desired to be analyzed (redefined as the "reference population"), then the reference portions for the first partition 217 may be increased, and the reference portions for the other partitions (e.g., the reference portion for the second partition 227) may be set to zero. In some aspects, various reference portions will be adjusted by the user 170 for various reasons, such as to increase or decrease the desired representation of personal data of one or more of the partitions (e.g., the personal data of the first partition 316 or for the second partition 326).

Partitioning Scheme Calculation

Figure 4:
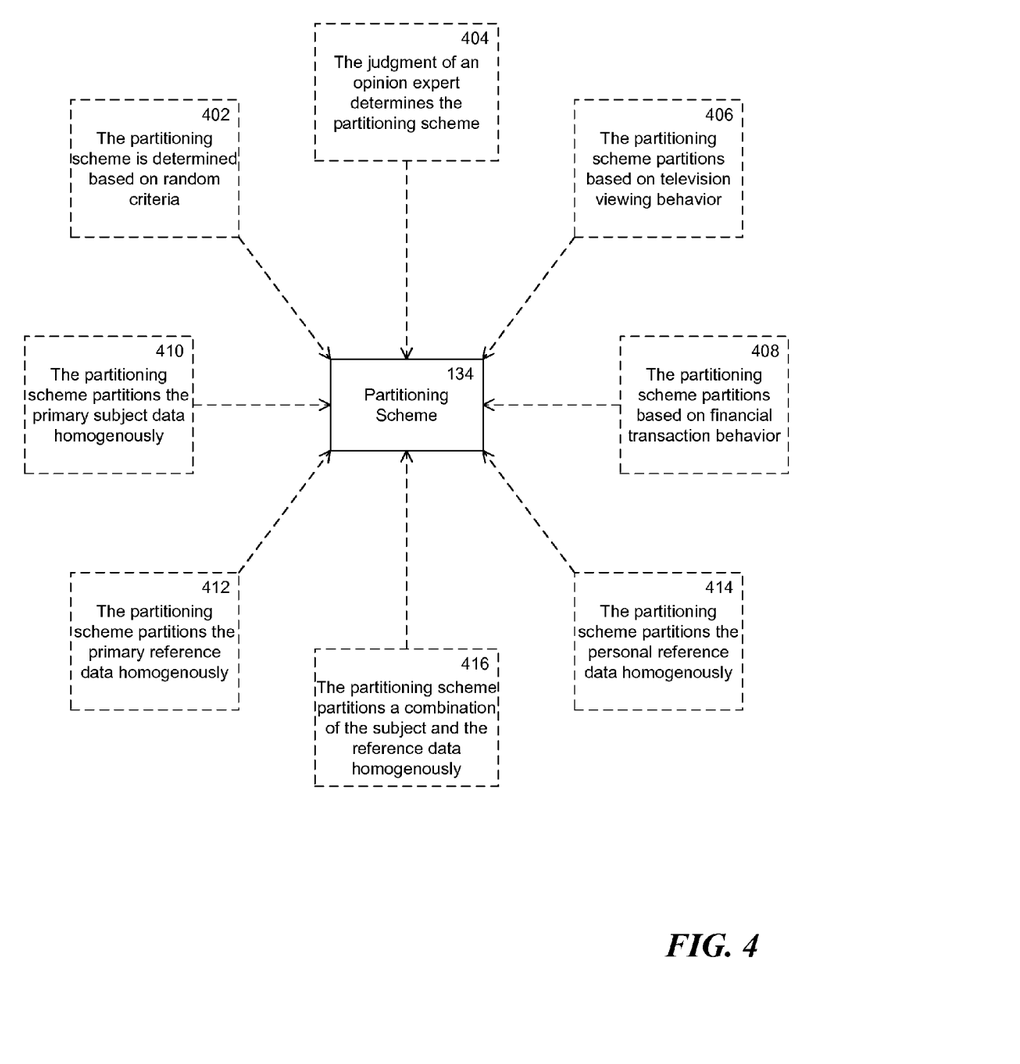
FIG. 4 is a schematic representation of representative methods for determining partitioning schemes that are useful for analyzing subject data.

FIG. 4 illustrates various factors that the partitioning scheme determining component 144 may utilize when determining a useful partitioning scheme 134 for the analysis of subject data performed by the system 100.

Factors that the partitioning scheme determining component 144 may utilize include, but are not limited to:

402—Determining the partitioning scheme based on random criteria, such as based on a random number.

404—Utilizing the judgment of an opinion expert for determining the partitioning scheme. For example, the user 170 may be able to provide useful instruction to the partitioning scheme determining component, via the user interface 180. In some cases, an opinion expert will experiment with multiple partitioning schemes 134 and perform judgments (such as by comparing which ones deliver desired results, and which ones do not). In some cases, the system may utilize an automated routine that solves for an optimal partitioning scheme based on parameters defined by an opinion expert (or in some cases, based on predetermined parameters). The optimization of the partitioning scheme may be based on, for example, using techniques known in the art for optimizing parameters, such as by utilizing the downhill simplex method, or other alternatives (such as non-linear optimization methods).

406—Determining a partitioning scheme that partitions data based on television viewing behavior. Partitioning based on television viewing behavior has been described above (for example, at least in the description relating to the example of FIG. 2), but many other various ways to analyze (and therefore, to partition) based on television viewing behavior are possible. In addition to television viewing behavior, other media usage behavior such as online Web activity, social media usage, mobile application ("app") interactions, online video viewing, and so on and so forth may be used to determine the partitioning.

408—Determining a partitioning scheme that partitions based on financial transaction behavior. When the survey or reference data includes financial transactions, such as the bank card transaction log of a cash register, or the annual summary information of a credit card holder's credit card transactions, the partitioning scheme may partition the data based on for example, the time of financial transaction, what product or service (or corresponding product or service category) was purchased by the transaction, the location at which the transaction was performed, what was the monetary value of the transaction, in what currency was the transaction performed, which transaction network or transaction type (e.g., Visa, Mastercard, American Express, Discover, online payment, personal check, cash, and so on) was utilized for the transaction, how frequently were the transactions performed, and so on.

Likewise, various partitioning schemes may be utilized by the partitioning scheme determining component 148 for other transaction types, such as analyzing donation transactions, analyzing a location history (such as a travel history of the flights of one or more airlines, or the history of a global positioning device's coordinates), analyzing the call history for a wireless service account, filtering e-mail transaction information, such as by the frequency of the e-mail sent and to which target domains were e-mails sent, and so on.

410—Determining a partitioning scheme that partitions the primary subject data set homogenously, such as by analyzing the homogeneity of the partitioned primary subject data set and making sure it does not have patterns between the participants, i.e., the primary subject data set in a partition is random. If the data is not homogenous (e.g., if further patterns distinguishing different participants in the data of a given partition are evident), it may be a sign that additional partitioning (e.g., changing the partitioning scheme so that it partitions into a larger number of partitions) could be useful. In some aspects, the homogeneity may be estimated based on the number of participants in the partitions. Some partitions may be determined to have many more participants than others, and may perhaps flag the system to modify its partitioning scheme to further subdivide those partitions into additional partitions, or otherwise alter the partitioning scheme to yield fewer participants in a partition. In some cases, partitions with too few participants may be flagged for combining, such as to simplify the partitioning process, or to improve computational efficiency, etc.

412—Determining a partitioning scheme that partitions the primary reference data homogenously. The discussion above with respect to partitioning the primary subject data homogenously (410) may be applied for the primary reference data 304 (and its corresponding residents 160), rather than the primary subject data set 132 (and its corresponding participants 120).

414—Determining a partitioning scheme that partitions the personal reference data homogenously. This can be very useful for dividing a population into likely different demographic groups, and the like. The partitioning scheme 134 still must partition data sets according to the primary data (e.g., 204 and 304); however the personal reference data of the partitions (e.g., 316, 326) can be analyzed such as for homogeneity (for example, by analyzing whether the personal data 316 and 326 in the reference partitions 310 and 320 are homogenous). In some aspects, an indication that the personal data in the reference partitions is not homogenous is an indicator to the partitioning scheme determining component 148 that further refinement of the partitioning scheme 134 is necessary.

416—Determining a partitioning scheme that partitions a combination of the primary subject data and the reference data (such as at least one of the primary resident data 304 and the personal resident data 306). In some aspects, the subject data set 132 and the reference data set 138 may be combined, (in some cases, unequally weighted) and then the homogeneity of the partitioned result considered similarly to 410 and 412.

Although not required, aspects and embodiments of the invention utilize the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail herein. Indeed, the term "computer", as used generally herein, refers to any of the above devices, as well as any data processor or any device capable of communicating with a network, including consumer electronic goods such as game devices, cameras, or other electronic devices having a processor and other components, e.g., network communication circuitry.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices.

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

These and other changes can be made to the invention in light of the above Detailed Description. While the above description details certain embodiments of the invention and describes the best mode contemplated, no matter how detailed the above appears in text, the invention can be practiced in many ways. Details of the invention may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

We claim:

1. A method in a computing system for calibrating a subject data set of behavior data based on information from a reference data set of behavior data, each data set containing a plurality of participants and associated transactional data, the method comprising:
    partitioning the reference data set into a plurality of reference data partitions, using a data partitioning scheme, no two reference data partitions sharing a participant in common;
    partitioning the subject data set of behavior data into a plurality of subject data partitions using the data partitioning scheme, wherein:
        each of the plurality of subject data partitions is based on a viewer characteristic that corresponds to a characteristic associated with a corresponding reference data partition; and
        no two subject data partitions of the plurality of subject data partitions share a participant in common;
    calculating weights associated with each of the plurality of subject data partitions to adjust a distribution of the plurality of subject data partitions based upon a distribution of the plurality of reference data partitions;
    calculating a statistic for each of the plurality of subject data partitions; and
    preparing adjusted calculated statistics by applying the calculated weight for each subject data partition to the calculated statistic for each subject data partition, the applied weights producing calibrated estimates of the statistics for the plurality of subject data partitions.

2. The method of claim 1, wherein each weight is determined by:
    determining a reference portion by dividing the number of participants in a reference data partition by the total number of participants in the reference data set;
    determining a subject portion by dividing the number of participants in a subject data partition by the total number of participants in the subject data set; and
    dividing the first subject portion by the first reference portion.

3. The method of claim 1, wherein the weight is expressed as a percentage or as an absolute number.

4. The method of claim 1, further comprising preconditioning the reference data set to reduce bias or improve accuracy prior to partitioning the reference data set into a plurality of reference data partitions.

5. The method of claim 4, wherein the preconditioning is based on population census data and the preconditioning involves adjusting the reference data set so that it more closely resembles the plurality of participants represented by the population census data.

6. The method of claim 1, further comprising preconditioning the subject data set to reduce bias or improve accuracy prior to partitioning the subject data set into a plurality of subject data partitions.

7. The method of claim 1, further comprising generating an estimate for a variable contained in the reference data set that is not contained in the subject dataset by:
    identifying a rate of occurrence of the variable in each of the plurality of reference data partitions; and
    applying the identified rate of occurrence for the variable in each of the plurality of subject data partitions.

8. The method of claim 7, wherein the value of the variable for each subject data partition is expressed as a single value, an interval value, or a range of values for each subject data partition, each of the range of values having an associated probability.

9. The method of claim 1, wherein the transactional data represents financial transactions.

10. The method of claim 1, wherein the financial transactions represent transactions selected from the group consisting of transactions made with a credit card, online transactions, cash register transactions, frequent flier transactions, and loyalty program transactions.

11. The method of claim 1, wherein the transactional data represents television viewing behavior or web browsing behavior.

12. The method of claim 1, wherein the statistic is a count of the number of transactions or a count of the number of entities performing transactions.

13. The method of claim 1, further comprising:
    combining the weights associated with each of the plurality of subject data partitions to calculate a total weight; and
    assessing a degree of closeness between the subject data set and the reference data set based on the total weight.

14. The method of claim 1, wherein the behavior data comprises at least one of television viewing data, online video data, online audio data, or internet browsing data.

15. A non-transitory computer-readable medium encoded with instructions that, when executed by a processor, perform a method in a computing system for calibrating a subject data set of behavior data based on information from a reference data set of behavior data, each data set containing a plurality of participants and associated transactional data, the method comprising:

partitioning the reference data set into a plurality of reference data partitions, using a data partitioning scheme, no two reference data partitions sharing a participant in common;

partitioning the subject data set of behavior data into a plurality of subject data partitions using the data partitioning scheme, wherein:

each of the plurality of subject data partitions is based on a viewer characteristic that corresponds to a characteristic associated with a corresponding reference data partition; and no two subject data partitions of the plurality of subject data partitions share a participant in common;

calculating weights associated with each of the plurality of subject data partitions to adjust a distribution of the plurality of subject data partitions based upon a distribution of the plurality of reference data partitions;

calculating a statistic for each of the plurality of subject data partitions; and preparing adjusted calculated statistics by applying the calculated weight for each subject data partition to the calculated statistic for each subject data partition, the applied weights producing calibrated estimates of the statistics for the plurality of subject data partitions.

16. The non-transitory computer-readable medium of claim 15, wherein each weight is determined by:

determining a reference portion by dividing the number of participants in a reference data partition by the total number of participants in the reference data set;

determining a subject portion by dividing the number of participants in a subject data partition by the total number of participants in the subject data set; and dividing the first subject portion by the first reference portion.

17. The non-transitory computer-readable medium of claim 15, wherein the weight is expressed as a percentage or as an absolute number.

18. The non-transitory computer-readable medium of claim 15, further comprising instructions that cause the computing system to generate an estimate for a variable contained in the reference data set that is not contained in the subject dataset by:

identifying a rate of occurrence of the variable in each of the plurality of reference data partitions; and applying the identified rate of occurrence for the variable in each of the plurality of subject data partitions.

19. The non-transitory computer-readable medium of claim 18, wherein the value of the variable for each subject data partition is expressed as a single value, an interval value, or a range of values for each subject data partition, each of the range of values having an associated probability.

20. The non-transitory computer-readable medium of claim 15, wherein the transactional data represents financial transactions.

21. The non-transitory computer-readable medium of claim 15, wherein the financial transactions represent transactions selected from the group consisting of transactions made with a credit card, online transactions, cash register transactions, frequent flier transactions, and loyalty program transactions.

22. The non-transitory computer-readable medium of claim 15, wherein the transactional data represents television viewing behavior or web browsing behavior.

23. The non-transitory computer-readable medium of claim 15, wherein the behavior data comprises at least one of television viewing data, online video data, online audio data, or internet browsing data.

24. A method in a computing system for calibrating a subject data set of behavior data based on information from a reference data set of behavior data, each data set containing a plurality of participants, the method comprising:

partitioning the reference data set into a plurality of reference data partitions, using a data partitioning scheme;

partitioning the subject data set of behavior data into a plurality of subject data partitions using the data partitioning scheme, wherein:

each of the plurality of subject data partitions has one or more variables that are in common with the one or more variables associated with the corresponding reference data partition;

calculating weights associated with each of the plurality of subject data partitions to adjust a distribution of the plurality of subject data partitions based upon a distribution of the plurality of reference data partitions;

calculating a statistic for each of the plurality of subject data partitions; and preparing adjusted calculated statistics by applying the calculated weight for each subject data partition to the calculated statistic for each subject data partition, the applied weights producing calibrated estimates of the statistics for the plurality of subject data partitions.

25. The method of claim 24, wherein each weight is determined by:

determining a reference portion by dividing the number of participants in a reference data partition by the total number of participants in the reference data set;

determining a subject portion by dividing the number of participants in a subject data partition by the total number of participants in the subject data set; and dividing the first subject portion by the first reference portion.

26. The method of claim 24, further comprising preconditioning the subject data set to reduce bias or improve accuracy prior to partitioning the subject data set into a plurality of subject data partitions.

27. The method of claim 24, further comprising generating an estimate for a variable contained in the reference data set that is not contained in the subject dataset by:

identifying a rate of occurrence of the variable in each of the plurality of reference data partitions; and applying the identified rate of occurrence for the variable in each of the plurality of subject data partitions.

28. The method of claim 27, wherein the value of the variable for each subject data partition is expressed as a single value, an interval value, or a range of values for each subject data partition, each of the range of values having an associated probability.

29. The method of claim 24, wherein the subject data set and the reference data set represent transactional data or behavioral data.

30. The method of claim 24, wherein the subject data set and the reference data set are associated with transactional data, and wherein the transactional data represent transactions selected from the group consisting of transactions made with a credit card, online transactions, cash register transactions, frequent flier transactions, and loyalty program transactions.

31. The method of claim 24, wherein the statistic is a count of the number of transactions or a count of the number of entities performing transactions.

32. The method of claim 24, further comprising:
  combining the weights associated with each of the plurality of subject data partitions to calculate a total weight; and
  assessing a degree of closeness between the subject data set and the reference data set based on the total weight.

33. The method of claim 24, wherein the behavior data comprises at least one of television viewing data, online video data, online audio data, or internet browsing data.

* * * * *